(12) United States Patent
Coderre

(10) Patent No.: US 10,040,507 B2
(45) Date of Patent: Aug. 7, 2018

(54) ERGONOMIC ADJUSTMENT SYSTEM FOR A CLIP-LESS BICYCLE PEDAL

(71) Applicant: Andre Coderre, Ste-Cahterine-de-Hatley (CA)

(72) Inventor: Andre Coderre, Ste-Cahterine-de-Hatley (CA)

(*) Notice: Subject to any disclaimer, the term of this patent is extended or adjusted under 35 U.S.C. 154(b) by 132 days.

(21) Appl. No.: 14/432,208

(22) PCT Filed: Oct. 1, 2013

(86) PCT No.: PCT/CA2013/000840
§ 371 (c)(1),
(2) Date: Mar. 29, 2015

(87) PCT Pub. No.: WO2014/053053
PCT Pub. Date: Apr. 10, 2014

(65) Prior Publication Data
US 2015/0291252 A1    Oct. 15, 2015

(30) Foreign Application Priority Data
Oct. 1, 2012  (GB) .................................. 1217555.0

(51) Int. Cl.
*B62M 3/08*    (2006.01)
(52) U.S. Cl.
CPC .................................. *B62M 3/086* (2013.01)
(58) Field of Classification Search
CPC ........ B62M 3/08; B62M 3/083; B62M 3/086; A43B 5/14; Y10T 74/2168; Y10T 74/217
See application file for complete search history.

(56) References Cited

U.S. PATENT DOCUMENTS

| | | | |
|---|---|---|---|
| 822,034 A | 3/1899 | Barnes | |
| 4,188,888 A * | 2/1980 | Cooper | B61F 5/16 105/199.4 |
| 4,599,915 A * | 7/1986 | Hlavac | B62M 3/08 74/594.4 |
| 4,947,708 A | 8/1990 | Lacombe | |
| 5,195,397 A | 3/1993 | Nagano | |
| 5,205,056 A * | 4/1993 | Okajima | A43B 5/14 36/131 |
| 5,557,985 A * | 9/1996 | Nagano | B62M 3/086 74/594.4 |
| 5,687,619 A | 11/1997 | Richard et al. | |
| 5,692,415 A | 12/1997 | Lin | |
| 5,727,429 A * | 3/1998 | Ueda | A43B 5/14 36/131 |
| 5,778,739 A * | 7/1998 | Takahama | B62M 3/086 36/131 |

(Continued)

*Primary Examiner* — Adam D Rogers

(57) ABSTRACT

An ergonomic adjustment system for clip-less bicycle pedal has the cleat and pedal body are so shaped that they form exactly complementary shapes that are based on parts of spherical shapes such that both spherical members and complementary spherical members have similar diameters so as to allow for perfect mating between the two which allow for smooth fluidic movement along axes X and Z. The cleat and pedal body have polymer lining. A rigid front receptacle and a rear flexible blade or traditional rear mechanism. Both the rigid receptacle and the rear section flexible blade or traditional rear mechanism are attached to the exterior periphery of the pedal's body and are used in conjunction with a cleat which is mechanically attached to a shoe.

7 Claims, 12 Drawing Sheets

(56) References Cited

U.S. PATENT DOCUMENTS

| | | | | |
|---|---|---|---|---|
| 5,852,956 A * | 12/1998 | Chen | B62M 3/086 | 74/594.4 |
| 6,564,676 B2 * | 5/2003 | Bezet | B62M 3/08 | 74/594.7 |
| 6,694,846 B2 | 2/2004 | Muraoka | | |
| 6,708,584 B2 * | 3/2004 | Muraoka | B62M 3/086 | 74/594.4 |
| 6,722,229 B2 | 4/2004 | Muraoka | | |
| 6,845,688 B2 * | 1/2005 | Muraoka | B62M 3/086 | 36/131 |
| 7,228,760 B2 * | 6/2007 | Reboullet | B62M 3/086 | 74/594.6 |
| 7,526,982 B2 * | 5/2009 | Chen | B62M 3/086 | 74/594.4 |
| 7,631,577 B2 * | 12/2009 | Chen | B62M 3/086 | 74/560 |
| 7,856,904 B2 * | 12/2010 | Lin | B62M 3/086 | 74/594.4 |
| 7,856,905 B2 * | 12/2010 | Hsieh | B62M 3/086 | 74/594.4 |
| 8,065,933 B2 * | 11/2011 | Coderre | B62M 3/086 | 36/131 |
| 8,272,150 B2 * | 9/2012 | Bryne | A43B 5/14 | 36/131 |
| 8,312,791 B2 * | 11/2012 | Inoue | B62M 3/086 | 36/131 |
| 8,661,938 B1 * | 3/2014 | Chen | B62M 3/086 | 74/594.6 |
| 8,857,292 B2 * | 10/2014 | Bryne | B62M 3/086 | 74/594.6 |
| 9,174,701 B2 * | 11/2015 | Servignat | B62M 3/086 | |
| 9,656,720 B2 * | 5/2017 | Takahama | B62M 3/086 | |
| 2002/0170382 A1 * | 11/2002 | Yang | B62M 3/086 | 74/594.6 |
| 2006/0162489 A1 * | 7/2006 | Raad | B62M 3/08 | 74/594.7 |
| 2012/0047772 A1 * | 3/2012 | Lin | A43B 5/14 | 36/134 |
| 2012/0132030 A1 * | 5/2012 | Kamada | B62M 3/086 | 74/594.6 |
| 2014/0260786 A1 * | 9/2014 | Bryne | B62M 3/086 | 74/594.6 |

\* cited by examiner

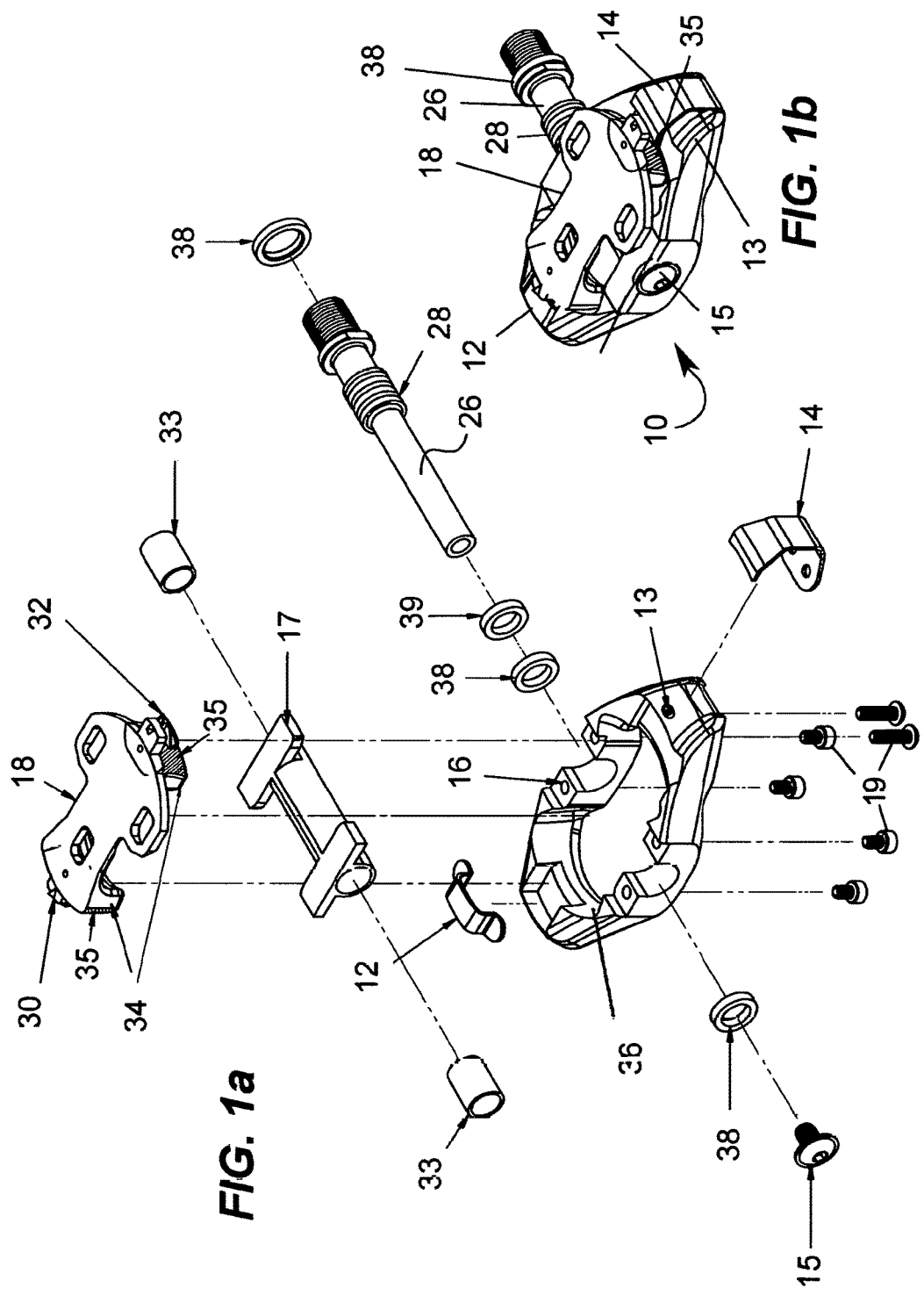

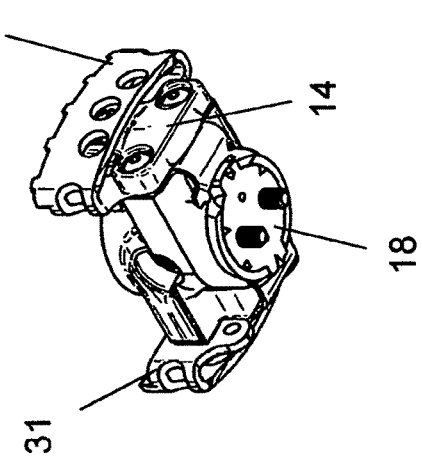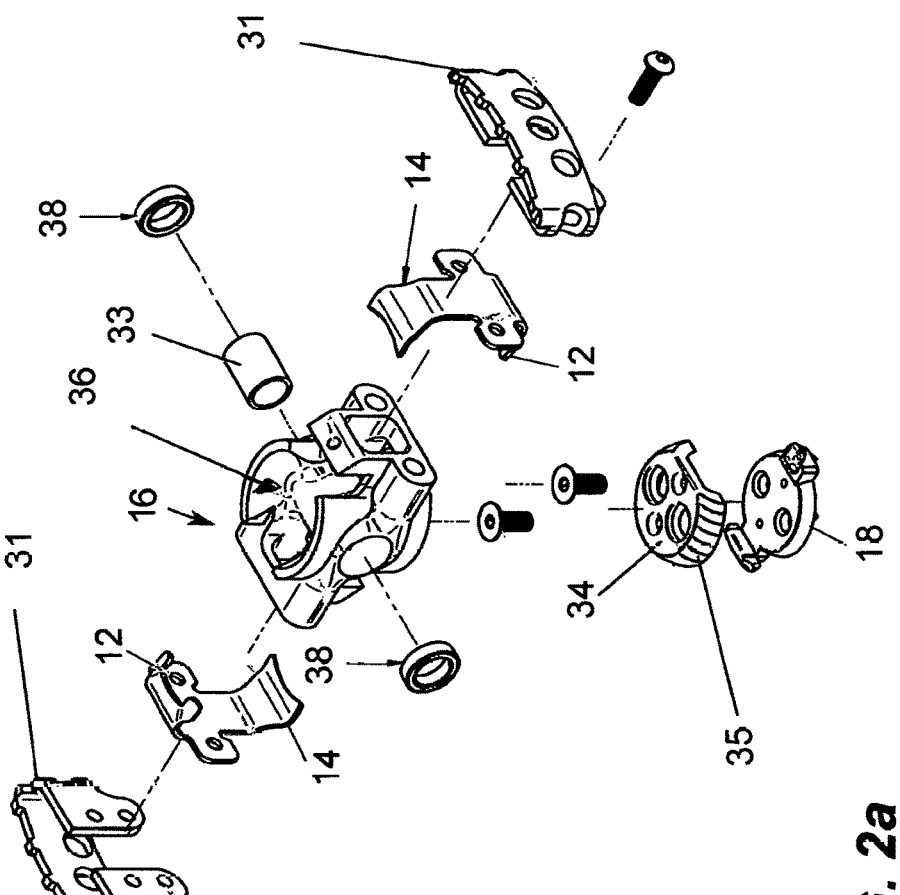

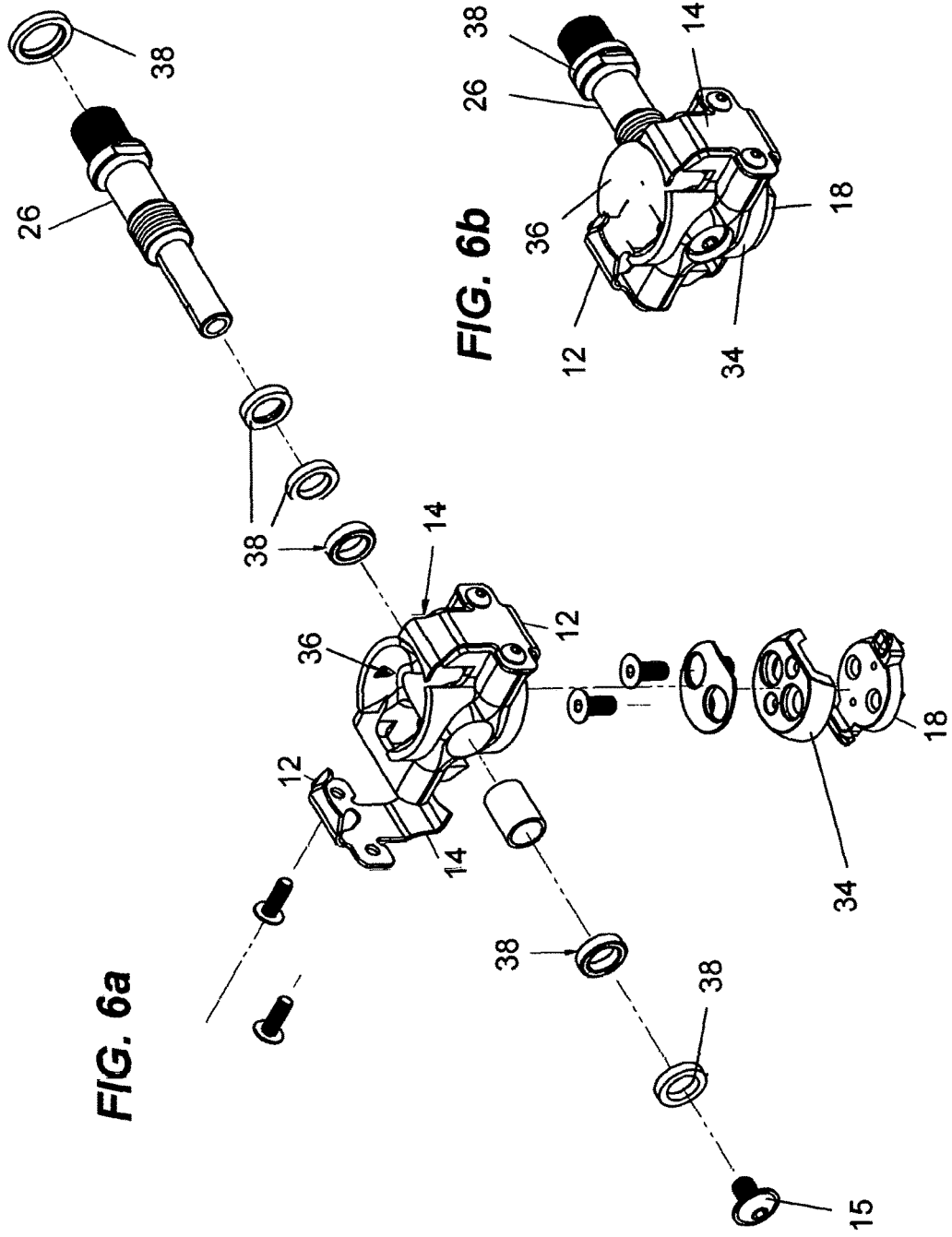

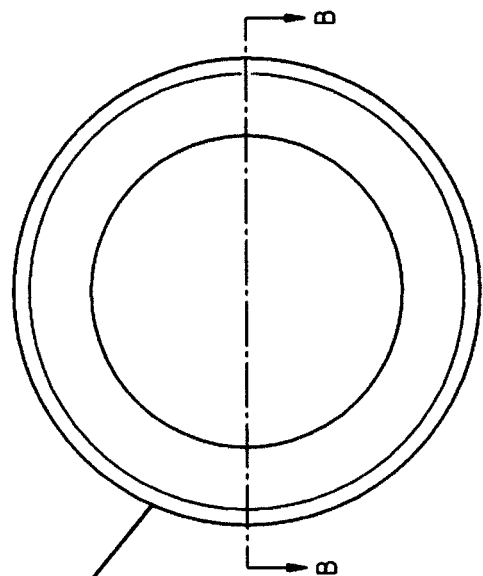
FIG. 8c  FIG. 8d
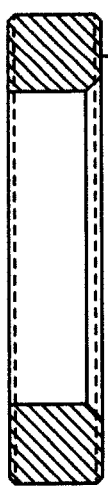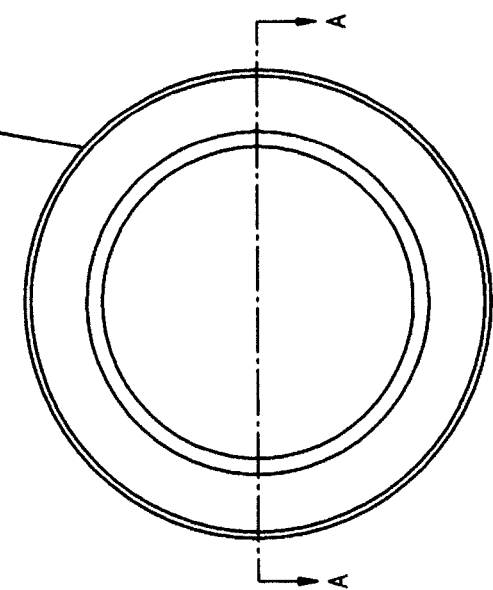
FIG. 8a  FIG. 8b

ERGONOMIC ADJUSTMENT SYSTEM FOR A CLIP-LESS BICYCLE PEDAL

FIELD OF THE INVENTION

The present invention relates generally bicycles but more particularly to a clipless bicycle pedal to be ergonomically efficient.

BACKGROUND OF THE INVENTION

Applicant has previously invented a clip-less pedal in U.S. Pat. No. 8,065,933. This application refers to an add on device which allows for a better ergonomic positioning of the font attached to the "clipless' pedal and/or a faster and easier removal of the shoe of an user. Although many innovations are related to that aspect, their solutions are less than adequate. Moreover, there is very little in the way of adjustment in the Q-factor of the pedal, which deals with the alignment of the ankle, the knee and the hip with the pedal so to reduce stress on joints and loss of efficiency.

It is important to understand that the Q-factor pedal is but one element in the lateral adjustment concept presented here to reduce the stress of misalignment of the ankle, the knee and the hip. The ball of the foot zone has to be positioned directly over the center of the pedal, hence the importance of being able to move the pedal laterally on the pedal axle. This allows for a personalized lateral adjustment for each foot and sets up a better alignment for the joints when combined with other elements such as more foot freedom for micro-movements in all axes while going through the full circular motion of pedaling action.

This also involves friction level between the shoe and the pedal so as to allow a level of freedom of movement between the human parts and the mechanical bicycle parts. Studies have shown that the bio-mechanical foot pedal junction, or interface must allow a certain freedom of movement of the foot along two axes simultaneously.

Current pedal technologies are inadequate in resolving these issues.

SUMMARY OF THE INVENTION

In view of the foregoing disadvantages inherent in the known devices now present in the prior art, the present invention, which will be described subsequently in greater detail, is to provide objects and advantages which are:

To provide for an interface (foot-hold) that allows the foot to be attached to the pedal while allowing it to be safe, no inadvertent disengagement (easy entry and exit of the foot in and out of the pedal).

It is a another advantage to allow for the autoregulation in real time of the ergonomic fit of the cyclist's foot using a cyclist shoe with a clipless pedal. During a pedal cycle, the foot's position is constantly changing due to the variation of forces executed on the pedal, these constant and repetitive micro movements have a direct impact on the alignment of the lower limb joints of the cyclist.

It is yet another advantage to have interchangeability of the pad or cleat which acts as interface between the shoe cleat and the pedal. This is instrumental in allowing flexibility in type of material used which impacts on friction and adherence. Also, allows for easy replacement when the pad is worn out or damaged but also, the pad, being made of less durable material, reduces wear on the more durable spherical body part of the pedal.

It is still another advantage to provide for an easy "Q-factor for the pedal" adjustment with different and specific design of the spacers to allow several lateral positions of the pedal body along the axle to adjust for the Q Factor.

It is still another advantage to provide for a unique permanent spacer, for each pedal located at the junction of the spindle or axle so as to provide a firm yet smooth transition between the pedal body and the axle so as to better transfer the force between the pedal and the axle.

It is still another advantage to have only one simple flexible rear blade per side of the pedal receiving the cleat and avoid using a regular helicoidal spring and associated components for the rear retention mechanism, making the pedal easier to manufacture, maintain, repair and keep free of mud.

It is still another advantage to have a regular traditional rear mechanism with hard part moving with a regular helicoidal spring.

In order to do so, the ergonomic bicycle pedal has a pedal body adapted to be adjustably and rotationally connected to a bicycle pedal axle, the pedal body includes a front receptacle on a front portion thereof, and a flexible rear blade adjustably attached to a rear portion thereof, or the "traditional" rear mechanism with hard part moving with a regular helicoidal spring. A cleat member including a front tooth configured to securely and removably connect with the front receptacle, a rear tooth configured to securely and removably connect with the flexible rear blade, or the traditional mechanism with helicoidal springs discussed hereinabove, and at least one sole retainer adapted to releasably connect a rider's bicycle shoe thereto.

The ergonomic bicycle pedal has the pedal body further comprise an adjustment screw connected between the flexible rear blade and the rear portion of the pedal body, such that the distance between the front receptacle and the flexible rear blade can be changed and adjusted to accommodate variously sized cleat members, and consequently the various tensions between these components.

The pedal body and the cleat member have complementary spherical portions, such that the cleat member is capable of rotational movement in only two axial dimensions with respect to the pedal body and without separating from the pedal body.

The cleat member further includes an extension platform releasably connected to the front tooth, and an extension platform releasably connected to the rear tooth, such that the cleat member can be adapted to accommodate bicycle shoes of varying sizes.

Each of the complementary spherical portions has a polymer lining to thereby provide a smooth fluidic movement therebetween.

The front tooth of the cleat member includes an angled entry surface adapted to guide the front tooth into proper position within the front receptacle of the pedal body, a blocker portion adapted to make contact with and limit forward movement with respect to the pedal body, and an angled exit surface adapted to guide the front tooth out and away from the front receptacle of the pedal body.

The rear tooth of the cleat member includes an angled entry surface adapted to guide the rear tooth into proper position within the flexible rear blade of the pedal body, or the traditional system discussed hereinabove, a retainer portion including a vargus-valgus protuberance, the retainer portion being adapted to make contact with and limit backward movement with respect to the pedal body, and an angled exit surface adapted to guide the rear tooth out and away from the flexible rear blade of the pedal body, or the traditional system discussed hereinabove.

An angle is chosen for the angled entry surface of the rear tooth of the cleat member such that when the front tooth is in position within the front receptacle, the rear tooth is snapped into place with the flexible rear blade generating a clicking sound which is adapted such that a bicycle rider can tell when the cleat member is in proper position within the pedal body, or the traditional system discussed hereinabove.

A sub-frame member releasably connected to a center portion of the pedal body, and shaped and positioned such that it does not interfere with the position or movement of the cleat member, and wherein the sub-frame member is adapted to releasably and adjustably connect with the bicycle pedal axle.

More particularly, the invention can be referred to as an ergonomic adjustment system for a clip-less bicycle pedal, wherein the adjustment system comprises an elongated axle formed in an elongated tubular shape having an attachment means on a proximal end adapted to securely attach to a bicycle pedal crank. An attachment means on a distal end to securely attach a bicycle pedal thereto, and a series of circumferential grooves along a portion of its axial length that are adapted to act as distance markers between a center of the bicycle pedal and a center of the bicycle, and act as a means to eliminate the accumulation of mud and debris between the axle member and the pedal. A bicycle pedal comprising a pedal body including a front receptacle on a front portion thereof, and a flexible rear blade adjustably attached to a rear portion thereof, a separable sub-frame member releasably connected to a center portion of the pedal body and including an elongated tubular opening therethrough adapted to rotationally receive the elongated axle therein; and a cleat member including a front tooth configured to securely and removably connect with the front receptacle, a rear tooth configured to securely and removably connect with the flexible rear blade, and at least one sole retainer adapted to releasably connect a rider's bicycle shoe thereto.

The ergonomic adjustment system has the elongated axle further comprised of a spacer ring positioned on the distal end of the elongated axle to more securely and rotationally hold a first side of the pedal body onto the elongated axle; and a spacer junction having a beveled edge and positioned on the elongated axle adjacent a second side of the pedal body opposite the first side, to thereby more securely and rotationally hold the second side of the pedal body onto the elongated axle, and thereby more efficiently transfer pedaling forces from the pedal to the axle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 1a-b Exploded view and isometric view, respectively, of a pedal with one side an extension platform for regular shoe purpose.

FIGS. 2a-b Exploded view and isometric view, respectively, of an alternate embodiment for use with a cyclist shoe.

FIG. 6a-b Exploded view and isometric view, as per FIGS. 2a-b but without the extension platform.

FIGS. 8a-d Top and cutaway views of spacer ring and spacer junction ring.

DETAILED DESCRIPTION OF THE INVENTION

Figure 3:
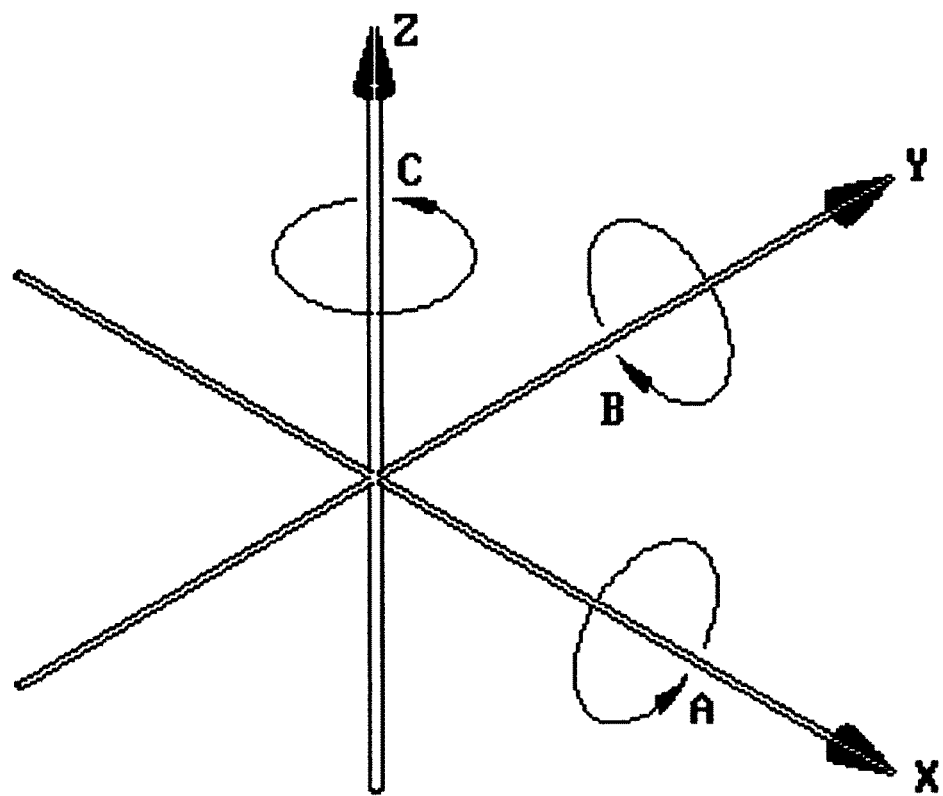
FIG. 3 Schematic view of the three axes.
Figure 4A:
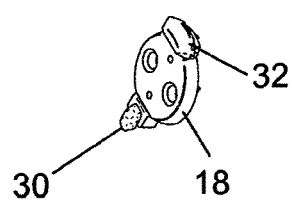
FIGS. 4a-i Various views of the cleat used with cyclist shoes.
Figure 4B:
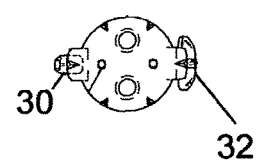
Figure 4C:
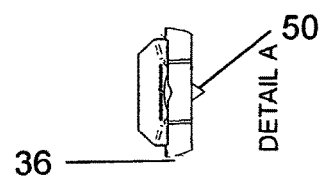
Figure 4D:
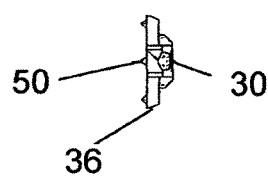
Figure 4E:
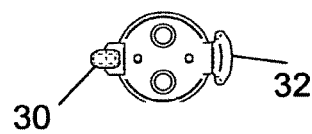
Figure 4F:
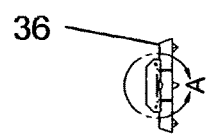
Figure 4G:
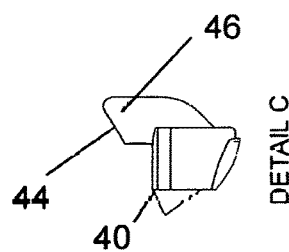
Figure 4H:
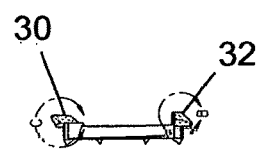
Figure 4I:
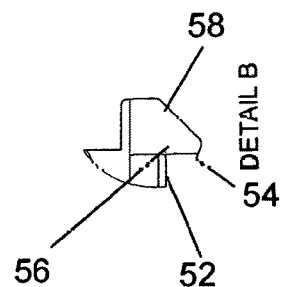
Figure 5A:
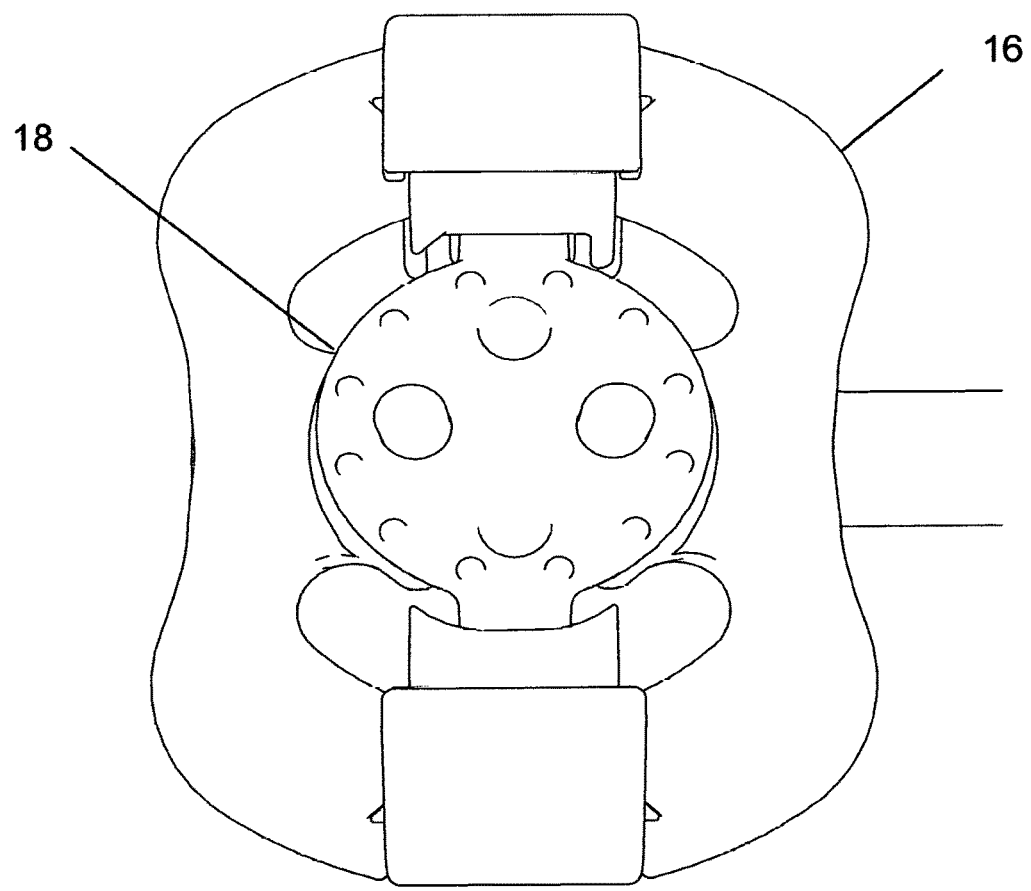
FIGS. 5a-c Top view of disengagement on a pedal.
Figure 5B:
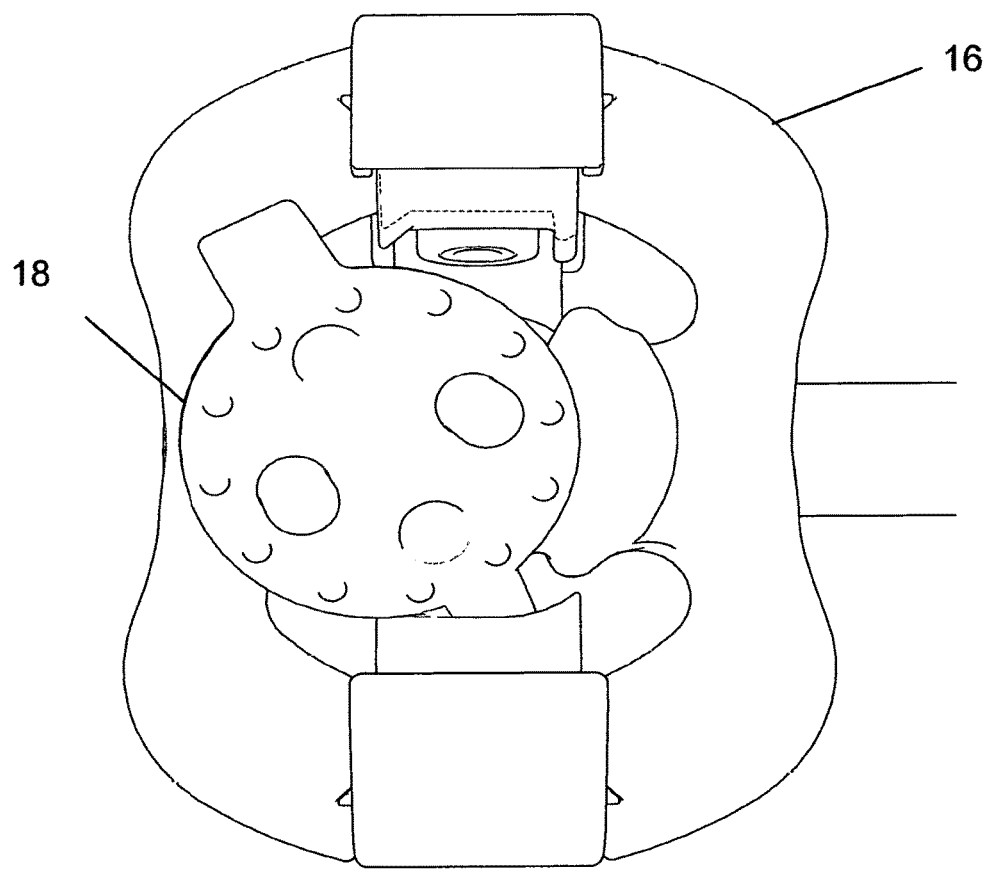
Figure 5C:
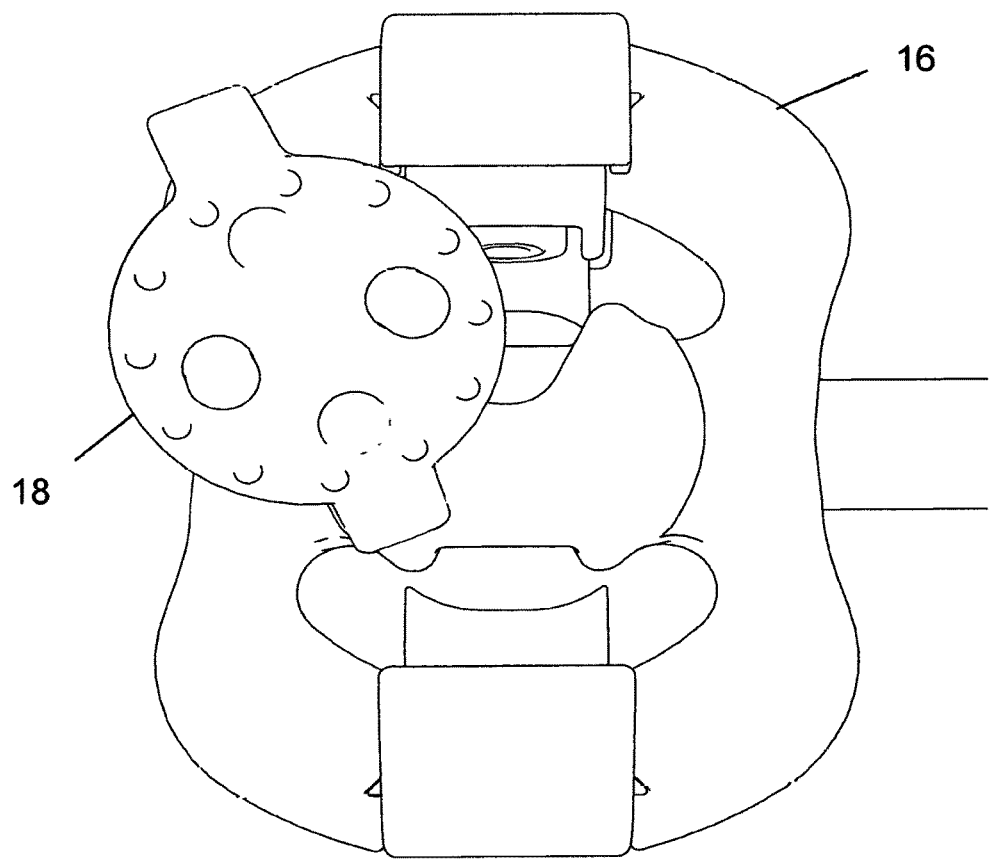
Figure 7A:
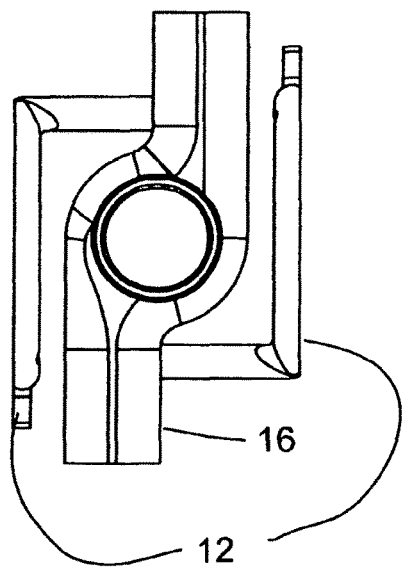
FIGS. 7a-d Side, top rear and isometric view of an alternate embodiment of the invention.
Figure 7B:
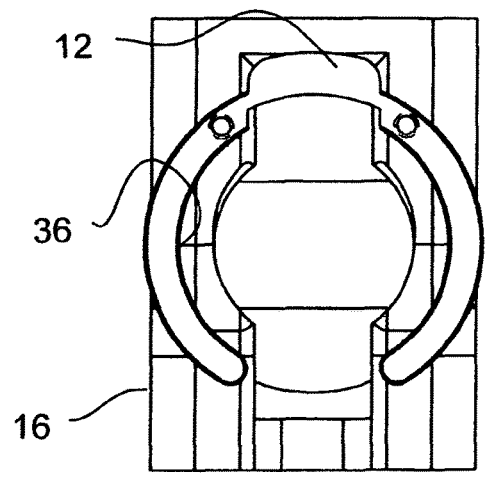
Figure 7C:
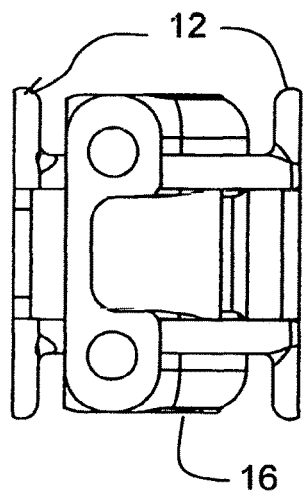
Figure 7D:
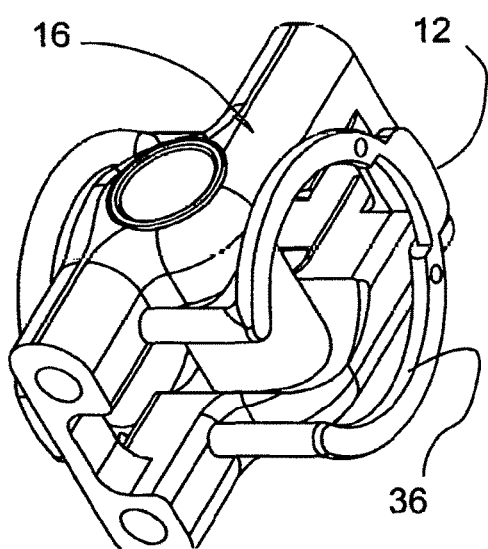

An ergonomic adjustment system (10) for clip-less bicycle pedal has a rigid front receptacle (12) and a rear flexible blade (14)

Both the rigid receptacle (12) and the rear flexible blade (14), or the traditional rear helicoidal spring are attached at the exterior periphery of the pedal's body (16) and are used in conjunction with the two major elements of this geometry complementary concept: First, a cleat (18) which is mechanically attached to a shoe (not shown) and second, the particular custom design part on the pedal body (16) to receive the cleat (18) An adjustment screw (13) pushes the rear flexible blade (14) to give the right distance with the front receptacle (12) and thus gives the correct tension to the rear flexible blade (14) and/or the traditional helicoidal spring discussed hereinabove.

In order to use the system (10) for initial insertion, a user inserts his shoe (not shown) from the rear towards the front of the pedal body (16) so that a front tooth (30) is caught by the front receptacle (12) and then a rear tooth (32) clips into the flexible blade (14) located at the rear of the pedal body (16) and/or the traditional helicoidal spring discussed hereinabove.

The cleat (18) consists of a plurality of parts designed to create the interface between the shoe (not shown) and the pedal (16). As such, some of the parts may differ in shape according to the pedal (16) it will be used on as well as the cleat (18) itself can vary in shape according to the shoe (not shown) it will be used on. The shoe (not shown) type itself changes according to the type of cycling, whether mountain bike, road bike, commuter or recreational bike and their associated pedal configuration and shape. For example, FIGS. 2*a-b* show an extension platform (31) designed for certain types of bicycles and the shoes typically used on that type of bicycles (road cleat for road shoe for road bicycle).

The axle or spindle (26) of the pedal (16) has a plurality of circumferential grooves (28) which act as both distance markers and for avoiding the accumulation of debris going underneath a bushing (33) and thus reduce pedaling efficiency. The circumferential grooves (28) indicate the distance between the center of the pedal (16) and the center of the bicycle, for the purpose of the Q-factor adjustments.

"Q-factor" adjustment is made by using at least one spacer ring (38) to shift the lateral positions of the pedal body along the axle.

A unique permanent spacer (39), for each pedal, is located at the junction of the spindle so as to provide a firm yet smooth transition between the pedal body and the axle so as to better transfer the force between the pedal and the axle.

Referring to FIG. 3, it is important to understand that when the shoe (not shown) is attached to the pedal body (16), it can move on the X and Z axes but not the Y axis, which must be voluntarily blocked (B) on the surface of the pedal body (16) when the shoe (not shown) is attached. It should be understood that the foot (shoe) should not move and only on this axis (front to back pedal or vice versa), and this is achieved with the front receptacle (12) located at the front of the pedal body (16), the rear tooth (32) transfers the tension on the rear flexible blade (14) forcing it to open by way of an upward movement (not downward) because it would otherwise create various problems including foot problems, especially at the exit. Over stressing the deformation of the rear flexible blade (14) can cause irreversible damage to it.

The upward and backward movement of the rear blade (14) is possible due to the combination of the angle of attack of the rear tooth (32) into the rear blade (14) which produces a «clicking» sound telling the user that his shoe (not shown) is properly engaged.

The cleat (18) has spherical members (34), preferably including a polymer lining (35) or any such material which impacts on friction and adherence, and the pedal body (16) has complementary spherical members (36) so shaped that both the spherical members (34) and complementary spherical members (36) form exactly complementary shapes that are based on spherical shapes which allow for perfect mating between the two so as to provide a smooth fluidic movement along axes Y and Z. In other words their diameters are almost exactly the same so that they mate perfectly together. This particularity is essential for creating the secure and ergonomic feature of this invention.

The complementary spherical member (36) is best seen in FIG. 6A wherein there are in fact a left and a right spherical segment forming together the complementary spherical member (36). (In FIG. 1A the complementary spherical member (36) is split between front and back). What we see is in fact the interior wall of a sphere segment or better yet, two hemisphere segments showing the southern hemisphere from the equator or near equator and down south. As for the spherical member (34), it represents the outer wall of a southern hemisphere from the equator or near equator and down south. (Note that in FIG. 6A it is shown upside down because it is meant to go on the flip side of the pedal body, both sides of the pedal body being identical). The advantage of the spherical and complementary spherical (34, 36) over the ball and socket (22, 23) of Applicant's original patent is that the axis point of the two axes motion is located at the equator and at the center of the circle made by a plane at the equator. In other words, dead center of a sphere. So the cleat (18) is held within the complementary spherical member (36) in such a way that it maintains the same center point even in motion on both axes simultaneously.

Other parts include a pedal sub frame (17) interfacing between the spindle (26) and the pedal body (16), and a main screw (15) which holds several components on the spindle (26). Other screws (19) hold other components as is known in the art.

The cleat (18)—more specifically as seen in FIGS. 4*a-i*, and which refer to the cleat (18) used with a cyclist shoe (as per FIG. 2)—has several components and characteristics which include: A blocker (40) to limit forward movement and which makes contact with the front part of the pedal body (16). A front tooth entry angle (44), a front tooth exit angle (46). A sole retainer (50) to work with the shoe (not shown). A rear tooth retainer (52). A varus-valgus protuberance (54), in the back in conjunction with the front tooth (30). A rear tooth exit angle (56) and a rear tooth entry angle (58).

Figure 9:
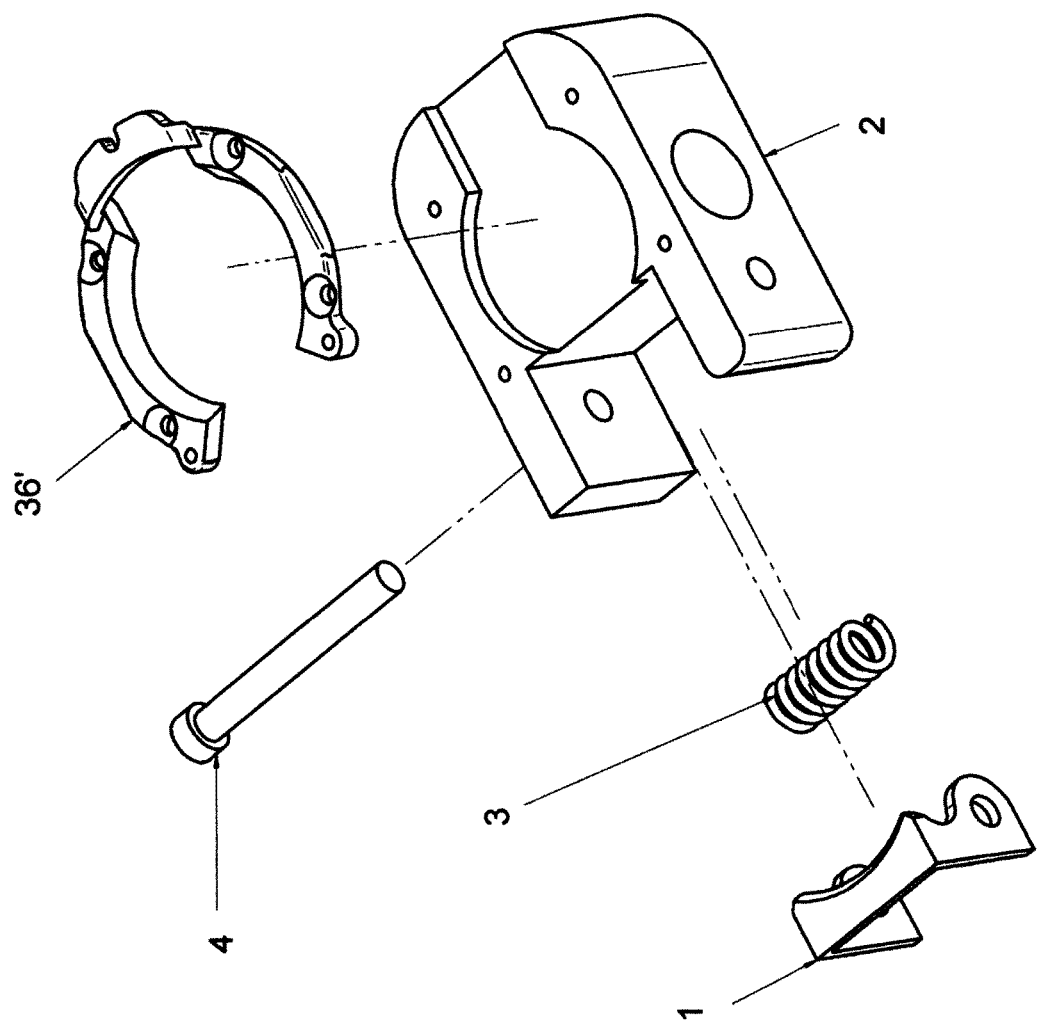
FIG. 9 isometric view of a helicoidal system of the prior art.

Referring to FIG. 9. A traditional system has an alternate pedal body (2) and a rear carriage (1) to receive the rear tooth (32) When the carriage (1) moves back, by way of an helicoidal spring (3) it closes down on the rear tooth (32). A small axle (4) holds the spring (3) and allows the pedal body (2) to pivot. And an alternate complementary spherical members (36').

Figure 10:
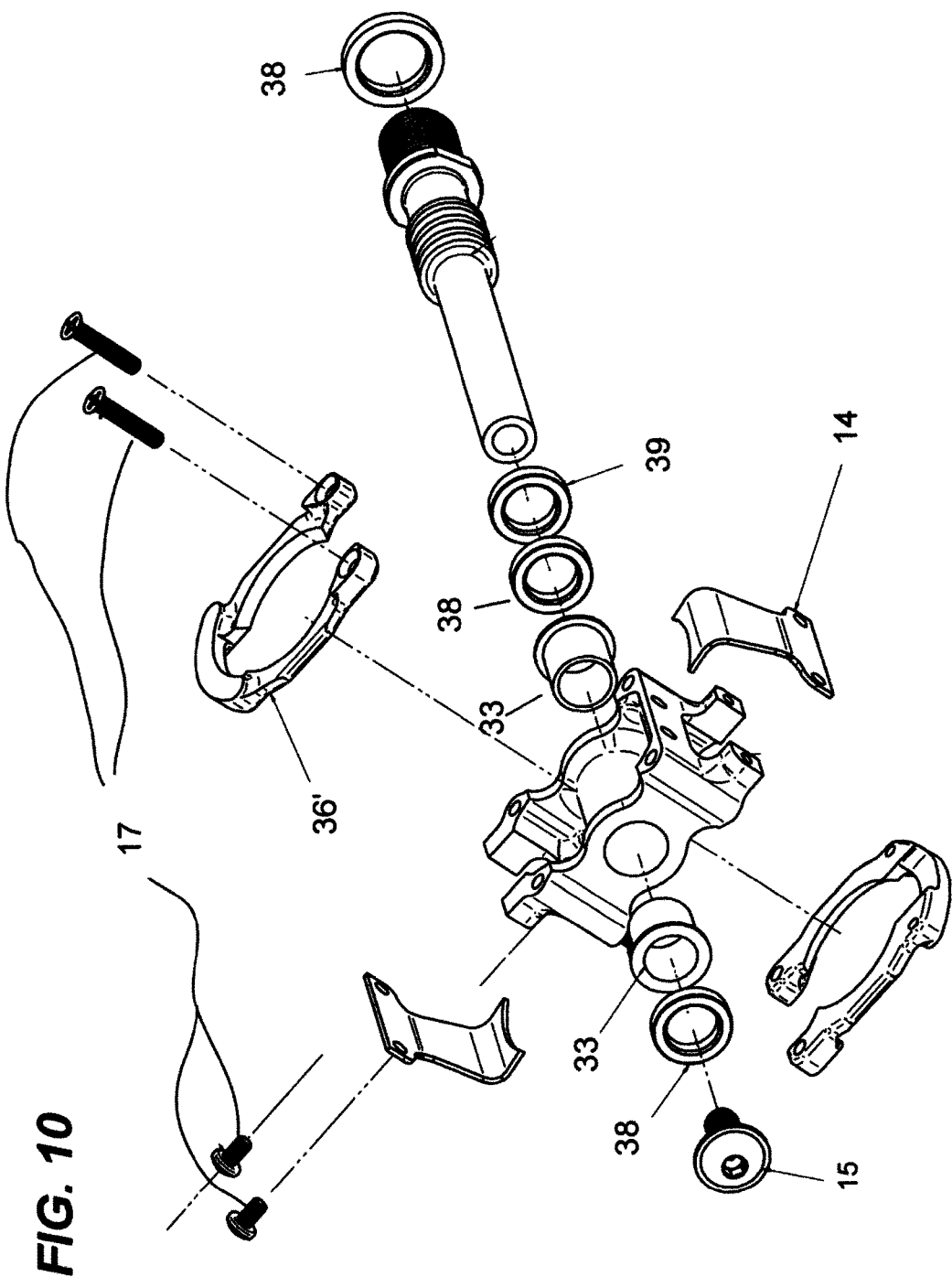
FIG. 10 isometric view of an alternate embodiment.

Referring to FIG. 10. An alternate pedal has the same alternate complementary spherical members (36'). as in FIG. 9, and an alternate pedal body shape (16'). This embodiment offers all of the features of the preferred embodiment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An adjustment system for a clip-less bicycle pedal, wherein the adjustment system comprises: a cleat member, wherein said bicycle pedal has a pedal body adjustably and rotationally connected to an axle of said bicycle pedal; said pedal body is comprised of a front receptacle on a front portion thereof, and a flexible rear blade adjustably attached to a rear portion thereof; and said cleat member including a front tooth configured to be removably connected with said front receptacle; a rear tooth configured to be removably connected with said flexible rear blade; and at least one sole retainer to releasably connect a rider's bicycle shoe thereto; said pedal body and said cleat member have spherical members configured and sized to mate such that said cleat member is capable of rotational movement in only two axial dimensions with respect to said pedal body and without separating from said pedal body; at least one of said spherical members has a polymer lining; said front tooth of said cleat member includes an angled entry surface to guide said front tooth into position within said front receptacle of said pedal body; a blocker portion to make contact with and limit forward movement with respect to said pedal body, and an angled exit surface to guide said front tooth out and away from said front receptacle of said pedal body; said rear tooth of said cleat member includes an angled entry surface to guide said rear tooth into position within said flexible rear blade of said pedal body; a retainer portion including a varus-valgus protuberance, said retainer portion configured to make contact with and limit backward movement with respect to said pedal body, and an angled exit surface to guide said rear tooth out and away from said flexible rear blade of said pedal body.

2. The adjustment system of claim 1, wherein said pedal body further comprises an adjustment screw connected between said flexible rear blade and said rear portion of said pedal body, such that the distance between said front receptacle and said flexible rear blade can be changed and adjusted to accommodate variously sized cleat members.

3. The adjustment system of claim 1, wherein said pedal body further includes extension platforms releasably connected to said flexible blade, such that said pedal body can accommodate bicycle shoes of varying sizes and types.

4. The adjustment system of claim 1, wherein an angle is chosen for said angled entry surface of said rear tooth of said cleat member such that when said front tooth is in position within said front receptacle, said rear tooth is snapped into place with said flexible rear blade generating a clicking sound when said cleat member is engaged within said pedal body.

5. The adjustment system of claim 1, further comprising a sub-frame member releasably connected to a center portion of said pedal body, and shaped and positioned such that it does not interfere with the position or movement of said cleat member; and wherein said sub-frame member is configured to releasably and adjustably connect with said bicycle pedal axle.

6. The adjustment system of claim 1, wherein a permanent spacer is located at a junction of said axle so as to provide a transition between said pedal body and said axle so as to better transfer the force between said pedal body and said axle.

7. The adjustment system of claim 1, wherein at least one spacer ring is used to laterally shift said pedal body along said axle; and a series of circumferential grooves along a portion of its axial length that act as distance markers and act as a means to avoid accumulation of debris between said axle and said pedal body.

* * * * *